United States Patent [19]

Yoo et al.

[11] Patent Number: 5,517,711
[45] Date of Patent: May 21, 1996

[54] TOOTHBRUSH

[75] Inventors: Kyong Y. Yoo, Kyongki-Do; Byong D. Choi, Seoul, both of Rep. of Korea

[73] Assignee: Byong Duk Choi, Seoul, Rep. of Korea

[21] Appl. No.: 288,004

[22] Filed: Aug. 10, 1994

Related U.S. Application Data

[63] Continuation-in-part of Ser. No. 145,188, Nov. 3, 1993, abandoned.

[30] Foreign Application Priority Data

Aug. 5, 1993 [KR] Rep. of Korea ............ 93-15016

[51] Int. Cl.⁶ ........................................ A46B 9/04
[52] U.S. Cl. ............................... 15/167.1; 15/110
[58] Field of Search ............... 15/110, 167.1, 15/246

[56] References Cited

U.S. PATENT DOCUMENTS

| | | | |
|---|---|---|---|
| 851,550 | 4/1907 | Nevius | 15/167.1 |
| 1,532,522 | 4/1925 | Heaver, Jr. | 15/110 |
| 1,993,662 | 3/1935 | Green | 15/110 |
| 2,094,240 | 9/1937 | Herrick | 15/167.1 |
| 2,253,210 | 8/1941 | Psiharis | 15/167.1 |
| 2,722,703 | 11/1955 | Green | 15/167.1 |
| 3,258,805 | 7/1966 | Rossnan | 15/167.1 |
| 3,553,759 | 1/1971 | Kramer | 15/110 |
| 4,800,608 | 1/1989 | Key | 15/167.1 |

FOREIGN PATENT DOCUMENTS

| | | | |
|---|---|---|---|
| 0310482 | 4/1989 | European Pat. Off. | 15/167.1 |
| 0360766 | 3/1990 | European Pat. Off. | 15/167.1 |
| 2930459 | 2/1981 | Germany | 15/167.1 |
| 3628722 | 2/1988 | Germany . | |
| 57-148332 | 9/1982 | Japan . | |
| 63-178531 | 11/1988 | Japan . | |
| 1-108121 | 7/1989 | Japan . | |
| 2-98717 | 8/1990 | Japan . | |
| 4-6926 | 1/1992 | Japan . | |
| 1708283 | 1/1992 | U.S.S.R. | 15/167.1 |
| 1725817 | 4/1992 | U.S.S.R. | 15/167.1 |

*Primary Examiner*—David Scherbel
*Assistant Examiner*—Randall E. Chin
*Attorney, Agent, or Firm*—Birch, Stewart, Kolasch & Birch

[57] ABSTRACT

A device for molding a buffer cap at the same time of fixing the cap to the bristle base implanting head of a toothbrush body preform. In the buffer cap molding and fixing device, a stationary molding plate is coupled to a mounting plate by a stop rod such that it is limited in its moving distance. The stationary molding plate has a plurality of sprues aligning with a plurality of gate holes. The bottom surface of the stationary molding plate has a plurality of top cavities, communicating with the sprues through their respective gates and each having a wider section provided with a pair of holding projections for holding a toothbrush body preform. The gates are formed at necks of the top cavities respectively. A back up plate is interposed between the stationary mounting plate and the stationary molding plate. A core plate comes into contact with the stationary molding plate at a parting plane. The top surface of the core plate has a plurality of bottom cavities corresponding to the top cavities. The wider section of the bottom cavity has a recess showing a surface roughness of 0.1–0.45 μ.

1 Claim, 6 Drawing Sheets

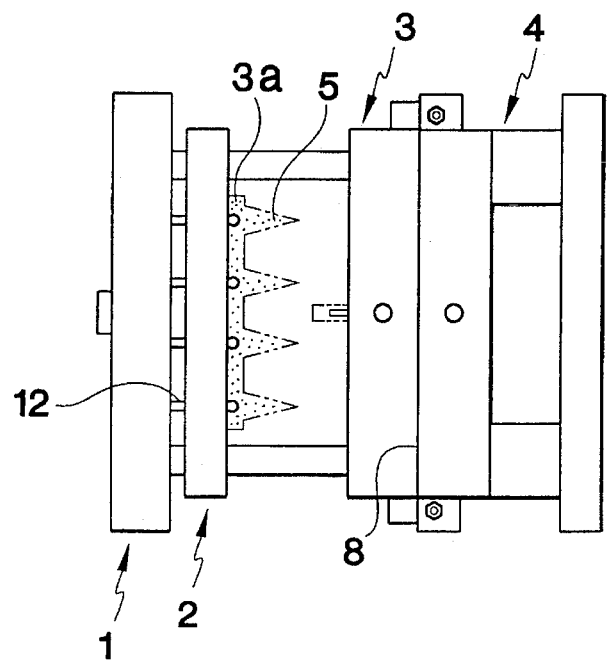
FIG. 4C
FIG. 5A
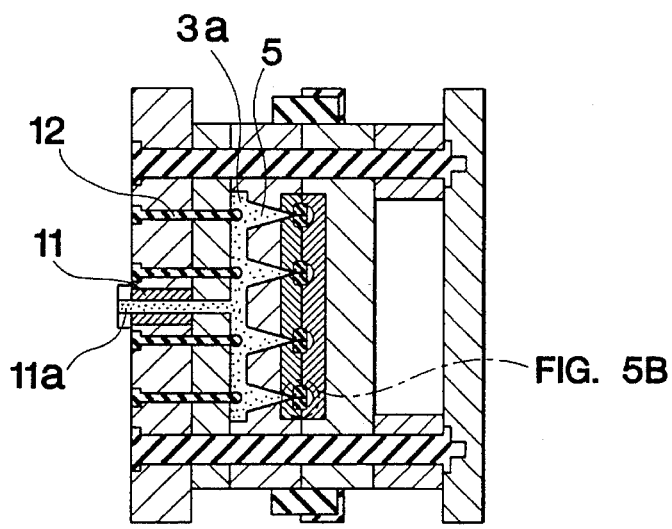
FIG. 5B
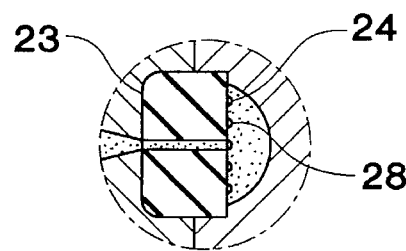

TOOTHBRUSH

This application is a continuation-in-part of application Ser. No. 08/145,188 filed on Nov. 3, 1993, now abandoned the entire contents of which are hereby incorporated by reference.

BACKGROUND OF THE INVENTION

1. Field of the Invention

The present invention relates to a toothbrushes body preform molding device and a toothbrush body preform to be provided with a buffer cap on the back of the bristle implanting head.

2. Description of the Prior Art

As well known to those skilled in the art, a typical toothbrush is manufactured by implanting a plurality of bristle bases into the stick-shape or hexahedral hard head of the toothbrush body preform. In the typical toothbrush, the hard bristle base implanting head as well as the handle may scratch the periodontal tissue surface and the oral cavity when brushing the tooth. In this regard, the above hard toothbrush may have a bad effect on the oral hygiene.

In an effort to overcome the above problem, Japanese Utility Model Laid-open Publication No. Heisei. 4-6926 discloses a toothbrush having a relatively thicker soft member mounted on the brush head surface. When implanting the bristles in the above toothbrush, the bristle bases are implanted in the soft member. This toothbrush, while providing some elasticity for the bristle base implanting portion of the brush head, nevertheless has a problem that it cannot achieve the desired elasticity of the toothbrush body. In this regard, this toothbrush still may scratch the periodontal tissue surface and the oral cavity and exert a bad influence upon the oral hygiene.

Japanese Utility Model Laid-open Publication No. Sho. 57-148332 discloses a toothbrush having a cushion rubber covering the bristle base implanting portion of the brush head. However, the above application represents neither the mounting strength of the cushion rubber nor the method of how to mount the cushion rubber on the toothbrush head. In this regard, the above toothbrush may not be practically used. Otherwise stated, the toothbrush having the cushion rubber about its head may exert a bad influence upon the oral hygiene and achieve no desired endurance of the cushion rubber.

Germany Patent No. DE 3628722 discloses a toothbrush having a handle with a head, made of plastics by injection molding, with a rigid setting for the material. In this toothbrush, both the narrow sides and the top of brush head are coated by an elastomer or a plastomer with a softer setting. The trouble of the Germany patent does not disclose how to rigidly fix the coating material to the brush head through a conventional injection molding. Considering that the elastic material like rubber and the hard head material are quite different from each other in their melting points, their bonding forces and their percentages of contraction, a process of sticking two different materials together sufficiently enough to use in sanitary objects in mass production never has been developed.

SUMMARY OF THE INVENTION

It is, therefore, an object of the present invention to provide a toothbrush body preform for easily rigidly fixing a buffer cap to its head back at the same time of molding of the buffer cap, which preform overcomes the aforementioned problems and lets the buffer cap be more rigidly fixed to the bristle base implanting head of the toothbrush.

It is another object of the present invention to provide a device for molding a buffer cap at the same time of fixing the cap to the bristle base implanting head of the toothbrush to produce the toothbrushes with the buffer caps in mass production.

It is a further object of the present invention to provide an improved structure in the toothbrush body preform for more rigidly fixing the buffer cap to the back of the bristle base implanting head of the toothbrush.

In an aspect, the present invention provides a toothbrush buffer cap molding device comprising: a stationary mounting plate; a stationary molding plate coupled to the mounting plate by a stop rod such that it is limited in its moving distance with respect to the mounting plate by the stop rod, the stationary molding plate having a plurality of sprues aligning with a plurality of gate holes, the bottom surface of the stationary molding plate having a plurality of top cavities, the top cavities communicating with the sprues through their respective gates and each having a wider section provided with a pair of holding projections for holding a toothbrush body preform, the gates being formed at necks of the top cavities respectively; a back up plate interposed between the stationary mounting plate and the stationary molding plate; and a core plate coming into contact with the stationary molding plate at a parting plane, the top surface of the core plate having a plurality of bottom cavities corresponding to the top cavities of the stationary molding plate, each the bottom cavity including a neck and a wider section corresponding to them of a corresponding top cavity, the wider section of each bottom cavity having a recess showing a surface roughness of 0.1–0.45 μ.

In another aspect, the present invention provides a toothbrush body preform to be provided with a buffer cap on its head back including: a bristle base implanting surface having a plurality of bristle base implanting holes thereon; a buffer cap fixing hole provided on a neck of the preform, the fixing hole introducing a molding resin to the head back; and an uneven surface provided on the head back and having a plurality of protrusions for rigidly fixing the buffer cap to the head back, the uneven surface being arranged on the head back, a front end and opposed end sides of a preform head and extending to the buffer cap fixing hole and being formed by recessing the head back to a depth less than a thickness of the buffer cap, the opposed end sides being recessed along a portion thereof so as to not only guide the molding resin but also prevent leakage of the molding resin during a buffer cap molding process.

BRIEF DESCRIPTION OF THE DRAWINGS

The above and other objects, features and other advantages of the present invention will be more clearly understood from the following detailed description taken in conjunction with the accompanying drawings, in which:

FIGS. 1A to 1C are exploded perspective views of a molding device for molding a buffer cap at the same time of fixing the cap to the bristle base implanting head of a toothbrush body preform in accordance with a preferred embodiment of the present invention;

FIGS. 4A to 4C are side views of the device of FIG. 1, showing the process for molding the buffer cap and fixing the cap to the back of the bristle base implanting head of the toothbrush body preform, in which:

FIG. 4A shows a stationary molding part and a core plate separated from each other before molding and fixing process of the buffer cap;

FIG. 4B shows the stationary molding part and the core plate in buffer cap molding and fixing process; and FIG. 4C shows both the stationary molding plate and a back up plate separated from a stationary mounting plate after cooling of the molding resin;

FIGS. 5A and 5B are sectional views of the device of FIG. 1, showing the injection of molding resin for molding the buffer cap at the same time of fixing it to the bristle base implanting head of the toothbrush body preform;

DESCRIPTION OF THE PREFERRED EMBODIMENTS

Figure 1B:
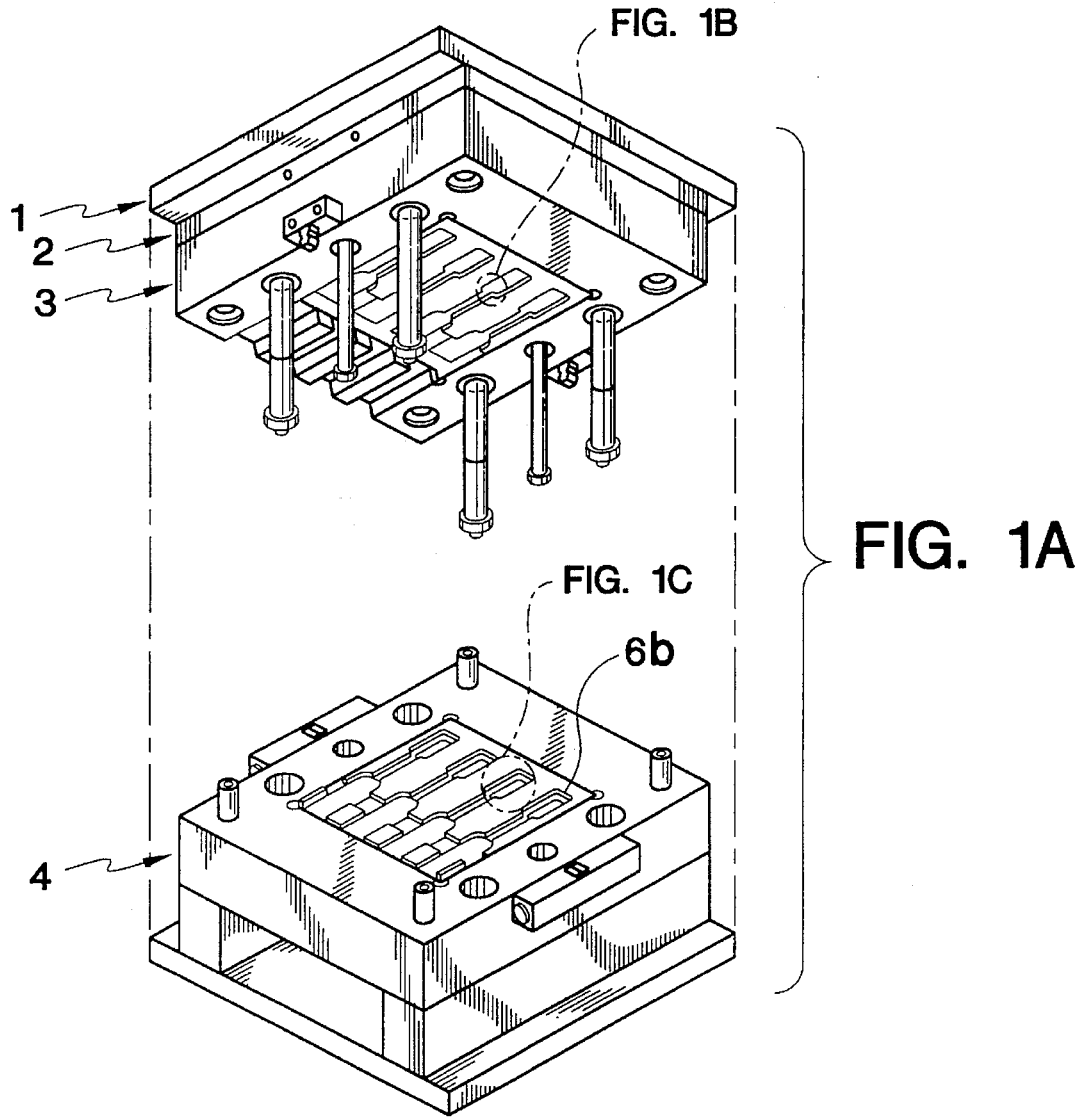
Figure 1C:
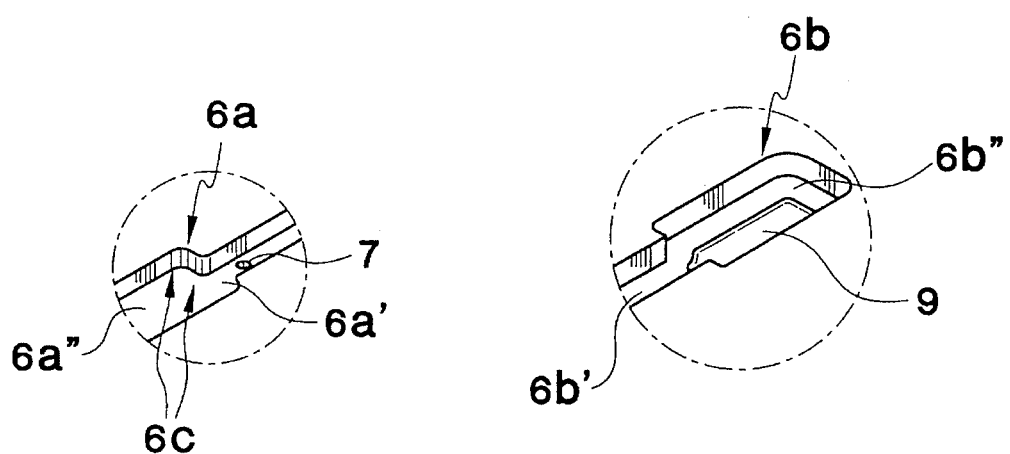
Figure 2:
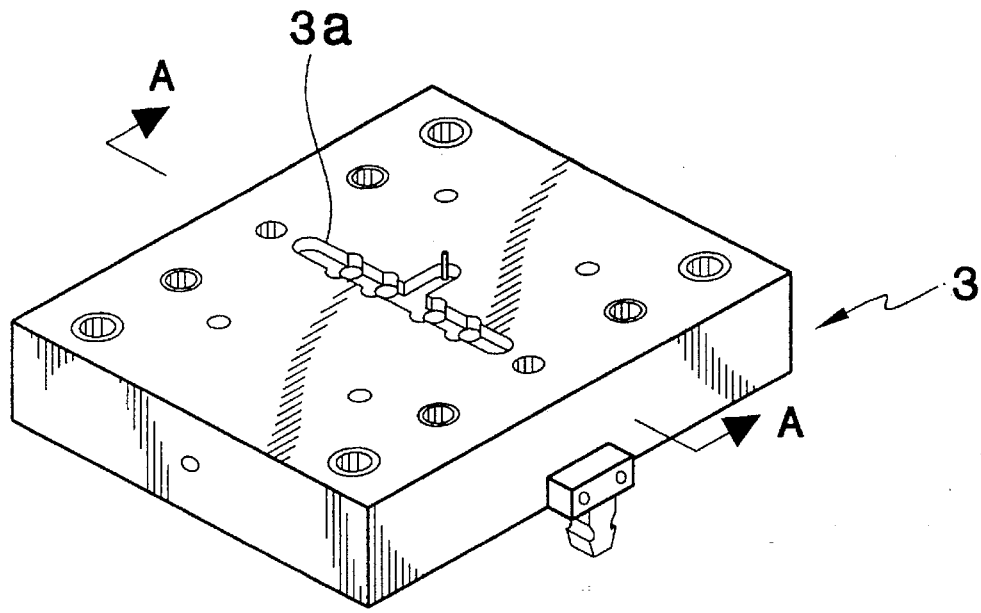
FIG. 2 is a perspective view of a stationary molding plate of the molding device of FIG. 1.
Figure 3:
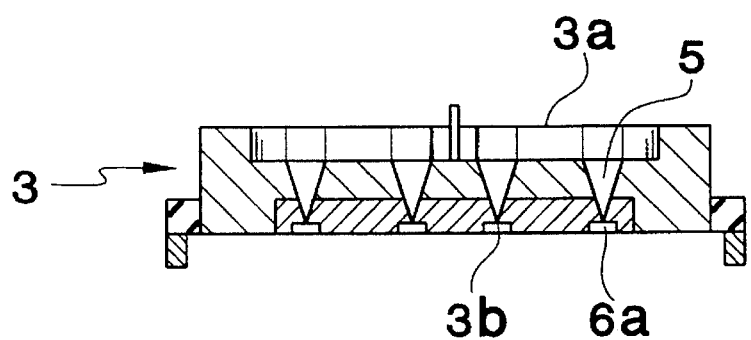
FIG. 3 is a sectional view of the stationary molding plate of FIG. 2.
Figure 6:
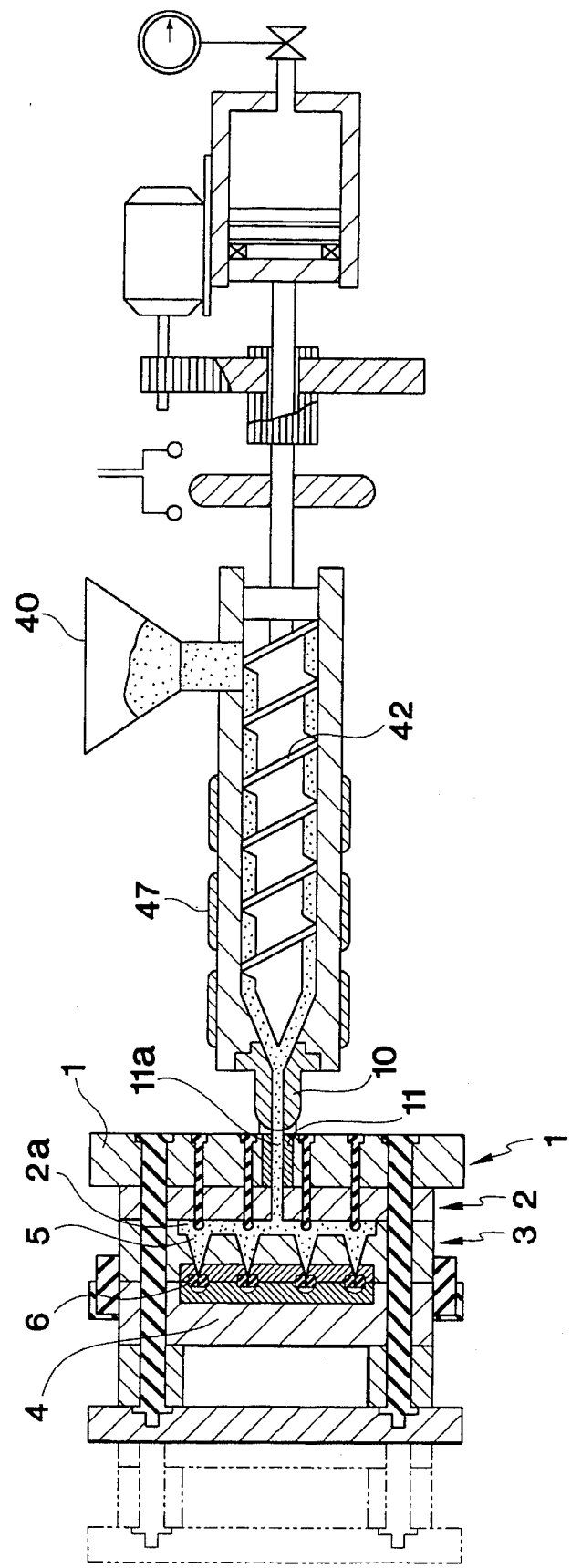
FIG. 6 is a sectional view of the molding device of FIG. 1 coupled to a conventional screw feeder and a conventional exterior cylinder.
Figure 9:
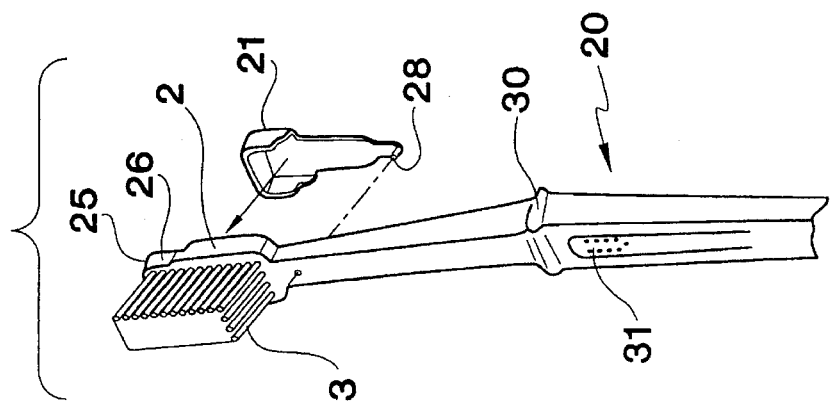
FIG. 9 is an enlarged perspective view of the toothbrush of the present invention, showing the toothbrush body separated from the buffer cap.
Figure 8:
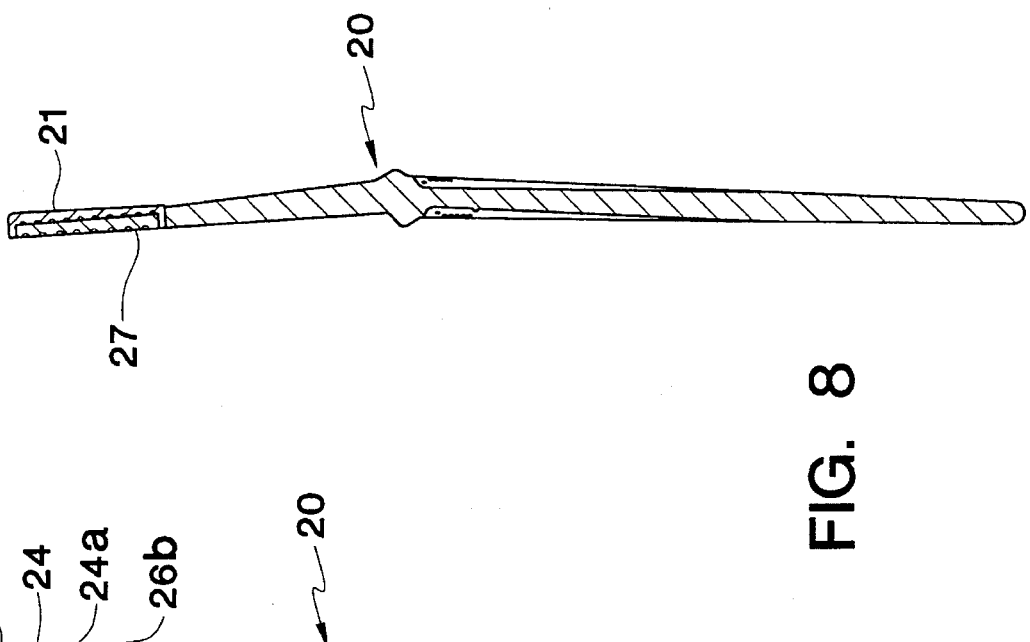
FIG. 8 is a side view of a resulting toothbrush provided with the buffer cap on its head back by the molding process of the device of FIG. 1.
Figure 7:
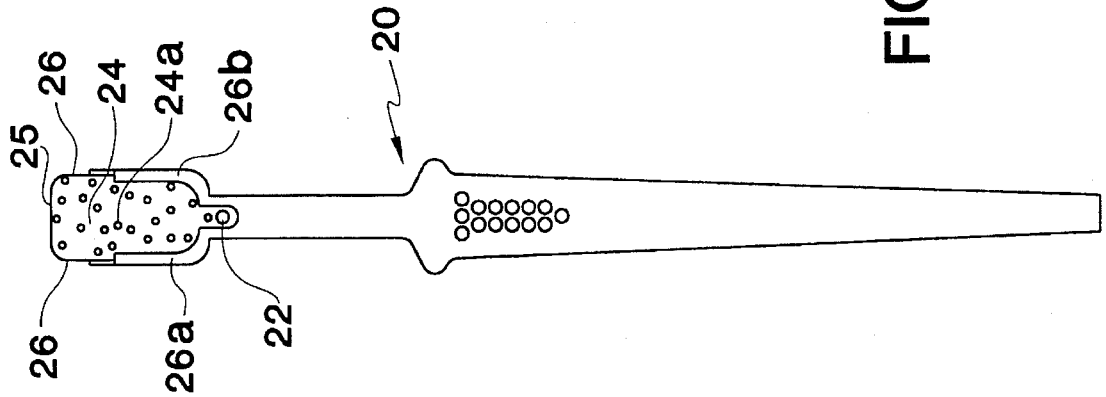
FIG. 7 is a plan view of the toothbrush body preform without a buffer cap.

With reference to the drawings, FIG. 1 shows a molding device in accordance with a preferred embodiment of the present invention, FIGS. 2 and 3 show a stationary molding plate of the device of FIG. 1, FIGS. 4A to 4C show a buffer cap molding and fixing process of the device of FIG. 1, FIG. 5 shows injection of resin into the device of FIG. 1 for molding the buffer cap at the same time of fixing it to a toothbrush body preform, FIG. 6 shows the molding device of FIG. 1 coupled to a conventional screw feeder and a conventional exterior cylinder for supply of molding material, FIG. 7 shows the toothbrush body preform free from a buffer cap, and FIGS. 8 and 9 show the resulting toothbrush having the buffer cap according to the present invention.

In the present invention, the injection molding device for molding the buffer cap at the same time of fixing it to the head back of the toothbrush body preform is a kind of screw inline type injection molding device wherein a molten resin to be formed is injected from a nozzle of the screw feeder into molding dies. That is, the synthetic resin is fed by the screw of the screw feeder while being heated so as to be injected into a cavity of the mold dies through a sprue, a runner and gates of a stationary molding plate. The molding device is, thereafter, cooled prior to separation of a movable molding plate from the stationary molding plate, thus to provide the desired forming products. In the above molding device, a back up plate 2 is interposed between a stationary mounting plate 1 and the stationary molding plate 3. The stationary molding plate 3 has a plurality of second sprues 5 aligned with a plurality of gate holes of the cavities 6. The bottom surface of the stationary molding plate 3 is provided with a plurality of top cavities 6a each of which communicates with a corresponding second sprue 5 through a gate 7. Each gate 7 is formed at a neck 6a' of each top cavity 6a. A pair of spaced holding projections 6c extend downward from the surface of a wider section 6a" of the top cavity 6a. In buffer cap molding and fixing process, the stationary molding plate 3 comes into contact with a core plate 4 at a parting plane 8. The core plate 4 is provided on its top surface with a plurality of bottom cavities 6b corresponding to the top cavities 6a of the stationary molding plate 3. In the same manner as described for the top cavities 6a, each the bottom cavity includes a neck 6b' and a wider section 6b". In each bottom cavity 6b, a recess 9 having the surface roughness of 0.1–0.45 μ is formed to make it possible for molding the buffer cap. This recess 9 is defined for molding the buffer cap 21 to the head back of the toothbrush body preform 20. In accordance with the above molding device, the buffer cap 21 made of an elastic material different from the material of the toothbrush body preform 20 is rigidly fixed to the head back of the toothbrush body preform 20.

The toothbrush body preform 20 is molded prior to implanting of the bristles into a bristle base implanting surface 23 of the head, as shown in FIG. 5. This implanting surface 23 is provided with a plurality of bristle base implanting holes thereon. The back and a portion of the end side 26 of the preform 20 have an uneven surface 24 provided with a plurality of protrusions 24a thereon. The range of the uneven surface 24 covers the front end 25 and the opposed end sides 26 of the preform 20 to a buffer cap fixing hole 22 formed at the neck of the toothbrush body preform 20. The uneven surface 24 has a recessed formation to a depth less than the thickness of the buffer cap 21 which will be formed on and fixed to the uneven surface 24, and is partially recessed so as to form their respective side wall 26a and 26b. The side wall 26a and 26b of the opposed end sides 26 are to guide the molding resin and prevent the leakage of molding resin during the buffer cap molding process.

Figure 4A:
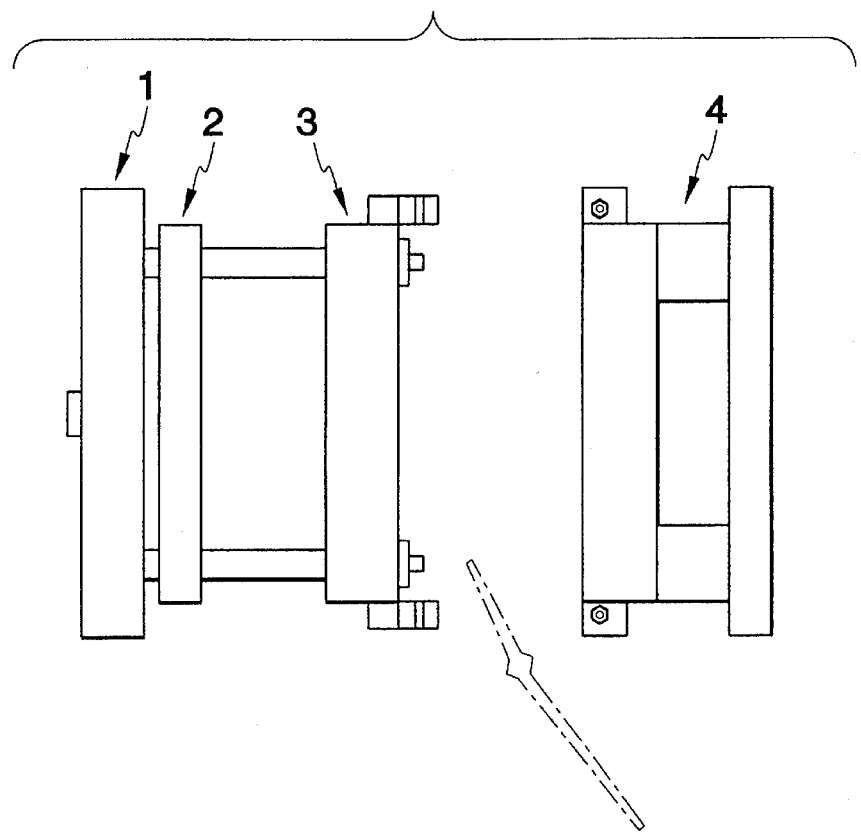
Figure 4B:
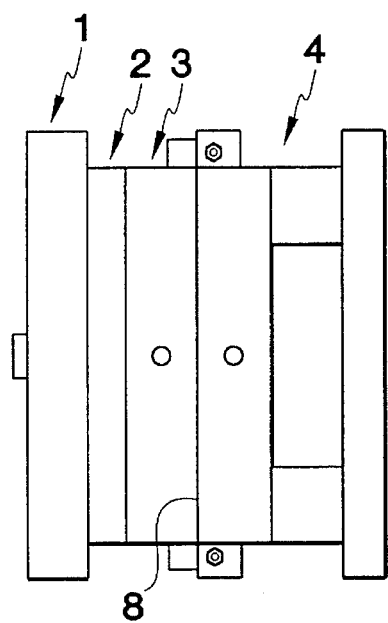

In order to form the buffer cap 21 and fix it to the head back of the toothbrush body preform 20, the molding device of FIG. 1 is coupled to a conventional screw feeder such that its sprue bush 11 is aligned with a nozzle 10 of the screw feeder. Thereafter, the back up plate 2, the stationary molding plate 3 and the core plate 4 are assembled as shown in FIG. 4B. At this time, the toothbrush body preforms 20 and the buffer caps 21 are tightly positioned in their places in the cavities 6 one and one prior to assembling of the plates 2, 3 and 4. In order to tightly position the toothbrush body preforms 20 in their places, the bristle base implanting holes 27 of the preforms 20 are fitted over the holding projections 6c, on the surfaces of wider sections 6a" of the top cavities 6a.

The above assembling step of the plates 2, 3 and 4 are followed by an introduction step of the elastic molding material into the cavities 6. That is, the elastic raw molding material powder through the hopper 40, which is to be melted after coming under the heating plate 43 of the screw feeder, continues to pass through the sprue 11a defined in the sprue bush 11, the runner 3a, the second sprues 5 and the gates 3b of the stationary molding plate 3 so as to fill up the cavities 6. The raw molding material comes to the back of the bristle base implanting head of the preform 20 just passing through the buffer cap fixing holes 22 of the neck of the preform 20 and it goes to cover up all the uneven surface 24 of the preform 20 including both the front end 25 and the opposed end sides 26 of the head as shown in the enlarged sectional view of FIG. 5. When the molding material is completely charged in the cavities 6, the core plate 4 is retracted from the mounting plate 1 while trailing both the back up plate 2 and the stationary molding plate 3 after the molding material cooled and solidified to take the formation of buffer cap(FIG. 9). However, since the back up plate 2 is limited in its moving distance by a predetermined length of the stop rods 12, it is not moved any more when it is spaced apart from the mounting plate 1 by a predetermined distance as shown in FIG. 4C. In addition, the stationary molding plate 3 is released from its joint with the core plate 4 at the parting plane 8, so that the molding material charged in both the runner 3a and the second sprues 5 is separated from the toothbrush body preforms 20, thus to provide desired toothbrush bodies provided with the buffer caps 21 on their head backs. The toothbrush bodies having the buffer caps 21 are in turn subjected to a continued step or a bristle implanting step by a bristle implanting machine, thus to provide finished toothbrushes.

As described above, the buffer cap molding and fixing device in accordance with the present invention produces an improved toothbrush having the buffer cap molded on and rigidly fixed to its head back as best seen in FIGS. 9. The fixing strength of the buffer cap to the head back of the toothbrush is doubled by the presence of fixing projection 28 tightly fitted in the buffer cap fixing hole 22 formed at the neck of the toothbrush body preform 20. With the presence of fixing projection 28, there is no problem of sudden separation of the buffer cap from the toothbrush body even when the toothbrush is applied with abrupt outside shock or rapidly heated or cooled during teeth brushings. Another advantage of the device of this invention is resided in that it produces the toothbrushes with the buffer caps on their head backs in mass production.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A toothbrush body preform including:

a head located at a first end of said toothbrush body preform, said head having a front and a back, said back being formed to receive a buffer cap thereon, said buffer cap having a predetermined thickness;

a neck located adjacent to said head, said neck including a buffer cap fixing hole;

a bristle base implanting surface having a plurality of bristle base implanting holes thereon; and said back of said head including a recessed portion, said recessed portion having a plurality of protrusions thereon forming an uneven surface, said recessed portion being recessed to a depth less than the thickness of said buffer cap.

* * * * *